(12) United States Patent
Gabzdyl et al.

(10) Patent No.: US 6,852,011 B2
(45) Date of Patent: Feb. 8, 2005

(54) WELD PREPARATION METHOD

(75) Inventors: Jacek Tadeusz Gabzdyl, Surrey (GB); Walter Mark Veldsman, Surrey (GB)

(73) Assignee: The BOC Group, plc, Windlesham (GB)

( * ) Notice: Subject to any disclaimer, the term of this patent is extended or adjusted under 35 U.S.C. 154(b) by 0 days.

(21) Appl. No.: 10/308,774

(22) Filed: Dec. 3, 2002

(65) Prior Publication Data
US 2003/0119423 A1 Jun. 26, 2003

(30) Foreign Application Priority Data

Dec. 7, 2001 (GB) .............................. 0129353

(51) Int. Cl.⁷ ................................ B24B 1/00
(52) U.S. Cl. ................... 451/38; 451/39; 451/40; 134/11
(58) Field of Search ............... 451/38, 39, 40, 451/90, 102; 134/7, 11

(56) References Cited

U.S. PATENT DOCUMENTS

| 4,038,786 | A | | 8/1977 | Fong |
| 5,071,486 | A | * | 12/1991 | Chasteen ................. 134/2 |
| 5,108,512 | A | * | 4/1992 | Goffnett et al. ............ 134/7 |
| 5,447,577 | A | * | 9/1995 | Gao et al. .............. 148/23 |
| 5,514,024 | A | | 5/1996 | Goenka |
| 5,525,093 | A | | 6/1996 | Palmer, Jr. |
| 5,599,223 | A | * | 2/1997 | Mains, Jr. ............. 451/39 |
| 5,616,067 | A | | 4/1997 | Goenka |
| 5,725,154 | A | | 3/1998 | Jackson |
| 5,836,809 | A | | 11/1998 | Kosic |
| 6,213,849 | B1 | | 4/2001 | Johnson et al. |

FOREIGN PATENT DOCUMENTS

| EP | 0 372 902 A1 | 6/1990 |
| EP | 0 689 897 A1 | 1/1996 |
| EP | 1 151 820 A2 | 11/2001 |

* cited by examiner

Primary Examiner—Eileen P. Morgan
(74) Attorney, Agent, or Firm—Joshua L. Cohen

(57) ABSTRACT

In a method of cleaning metal surfaces to be welded together, at least one jet carrying particles of solid carbon dioxide is caused to come into contact with the surfaces, where the solid carbon dioxide is allowed to sublime at the surfaces. The jet is formed by passing a stream of pressurised liquid carbon dioxide through a nozzle under pressure.

11 Claims, 1 Drawing Sheet

WELD PREPARATION METHOD

BACKGROUND OF THE INVENTION

Field of the Invention

This invention relates to a method of preparing metal surfaces for welding, and in particular cleaning of the surfaces for welding.

Fusion welding is widely used throughout manufacturing industry to join pieces of metal together. Fusion welding processes such as Gas Metal Arc Welding (GMAW), Gas Tungsten Arc Welding (GTAW), and Plasma Arc Welding (PAW) have the advantage that they can be readily automated and can therefore be used on a production line. Other welding processes that are used include laser welding.

Sometimes welds fail. One cause of failure is porosity. What typically happens is that the high temperature in the vicinity of the joint caused by the fusion welding process results in vaporisation and decomposition of contaminants such as oil present on the surfaces to be welded, hydrogen being formed as a decomposition product. Hydrogen has a high solubility in molten weld metal. Thus, if any hydrogen is formed by, for example, decomposition of oil it is readily dissolved by the molten weld metal. As the weld metal subsequently falls in temperature, so the solubility limit of hydrogen dramatically decreases. As a result, bubbles of hydrogen come out of the solution and form pores in the molten weld metal as it fuses. A visibly porous weld is thus formed. Such a weld is unacceptable as the pores may cause structural failure.

Some metals, particularly aluminium, magnesium, and titanium, and their alloys, are more prone than others to porosity. Aluminium alloys, in particular, are being increasingly used in engineering because of their lightness. One example of the increasing use of aluminium alloys is in the manufacture of car bodies.

Taking parts off a production line in order to clean them is not an acceptable solution to the problem of reducing incidences of porosity when welding.

There is therefore a need for improved methods of weld preparation suitable for use on a production line, which methods are able to reduce the incidence of porosity, particularly but not exclusively when welding parts of alloys based on aluminium, magnesium and titanium.

U.S. Pat. No. 6,213,849 relates to a method of preparing weld land areas of panels to be welded to each other. In the method, carbon dioxide granules or pellets are blasted against the weld land areas. This procedure includes the step of injecting solid carbon dioxide pellets into a flow of warm air. The panels are then shot blasted. Once the panels have been prepared by the two blasting steps, they are positioned adjacent to one another and welded together.

U.S. Pat. Nos. 5,836,809, 5,725,154, 5,616,067 and 5,514,024 and EP A 372,902 all relate to the formation of jets of gas carrying bodies of solid carbon dioxide.

SUMMARY OF THE INVENTION

According to the present invention there is provided a method of cleaning metal surfaces to be welded together, the method comprising the steps of positioning the metal surfaces with a weld gap therebetween ready for welding, causing at least one jet carrying particles of solid carbon dioxide to come into contact with the surfaces and to enter the weld gap, and allowing the particles of solid carbon dioxide to sublime in the weld gap, wherein the jet carrying particles of solid carbon dioxide is formed by passing a stream of liquid carbon dioxide under pressure through a nozzle.

The method according to the invention has several advantages.

First, the present invention effectively removes oil and similar contaminants from the surfaces to be fusion welded together. Second, carbon dioxide itself does not have a deleterious effect on the weld. Third, any deposit of solid carbon dioxide on the surfaces or in the weld gap sublimes very quickly and does not generally necessitate any slowing of production. On the other hand, conventional organic solvents can leave residual traces that themselves will act as a precursor to hydrogen in the welding process. Fourth, it is simple to automate the method according to the invention and install it in a production line. Fifth, and particularly importantly, the jet of carbon dioxide particles is effective in cleaning not only outer surfaces readily accessible on a production line, but also inner surfaces. Other advantages of the method according to the invention are disclosed below.

The jet carrying particles of solid carbon dioxide is formed by causing a stream of liquid carbon dioxide to be under such a pressure through a nozzle that a mixture of gaseous carbon dioxide and particles of solid carbon dioxide are formed. Suitable pressures for forming the mixture are well known in the art. For example, a pressure in the range of 20 to 50 bar is typically suitable. As a result, discharge velocities in the range of 25 to 100 m/s can be achieved. The nozzle is preferably located close to the surfaces to be cleaned, for example no more than 100 mm away. We have used distances in the range of 5 mm to 50 mm. The nozzle preferably has an on-off valve associated therewith, the valve able to be moved into its open position by activating a trigger. The nozzle preferably has an outlet of smaller internal diameter than the extent of the gap to be bridged by the weld.

The source of liquid carbon dioxide is typically a thermally-insulated storage vessel containing the liquid carbon dioxide under pressure or a conventional compressed gas cylinder containing liquid carbon dioxide. Preferably, the nozzle is connected to the vessel by means of a flexible hose.

The method according to the invention is particularly suitable for use in fusion welding together parts of an alloy based on aluminium, magnesium or titanium, but can also be used to weld together parts made of a large number of other metals, including ferrous metal.

The nozzle is preferably tracked at least once over the entire line of the weld to be made. Depending on the length of the weld, this may typically take up to one minute.

BRIEF DESCRIPTION OF THE DRAWINGS

The method according to the present invention will now be described with reference to the accompanying drawings, in which.

The drawings are not to scale.

DETAILED DESCRIPTION OF THE INVENTION

Figure 1:
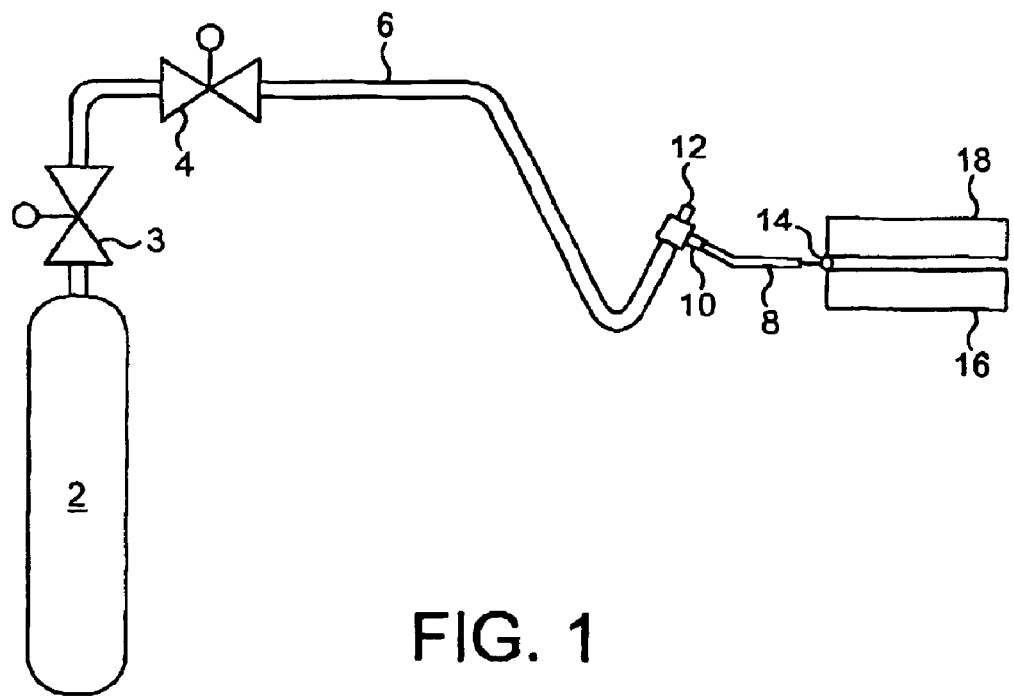
FIG. 1 is a schematic diagram of an apparatus for the method according to the present invention.

Referring to FIG. 1 of the drawings, a cylindrical container 2 of liquid carbon dioxide having at its head a manually-operable cylinder valve 3 and manually-operable pressure regulating valve 4 is connected by a flexible hose 6, typically of stainless steel, to a jet nozzle 8 for forming a jet of gas carrying particles of solid carbon dioxide.

In order to enable flow of the liquid carbon dioxide through the nozzle 8 to be established, the hose 6 terminates in a valve 10 which is able to be activated by operation of a trigger 12 or the like. Normally, the valve 10 is in its closed position, but depression of the trigger 12 will cause the valve 10 to open. If desired, the valve 10 may be a solenoid valve. The tip of the nozzle 8 is pointed at the line 14 of a weld to be made between two workpieces 16 and 18 of the same metal (e.g. an aluminium-based alloy) to be welded.

In operation, the cylinder valve 3 is opened and the pressure regulating valve 4 is set to the desired downstream pressure. The nozzle 8 is hand held with its tip close to and pointing at the line 14 of the weld to be made. The trigger 12 is manually operable to open the valve 10 and thereby to initiate flow of liquid carbon dioxide through the nozzle 8. The resulting pressure drop causes the liquid carbon dioxide to be converted into a jet of gas carrying solid particles of carbon dioxide 'snow'. The jet passes from the tip of the nozzle 8 and contacts the workpiece surfaces to be welded together. The momentum of the jet is such as to carry it into the narrow weld gap between the workpieces 16 and 18. The nozzle 8 is manually moved once or twice along the entire line 14 of the weld. Solid carbon dioxide particles are deposited on the surfaces to be welded. Once all deposited carbon dioxide has sublimed, the weld may be made by a fusion or other welding method. Experiments that we have performed involving the deliberate introduction of oil contamination onto the surfaces to be welded have shown that the method according to the invention is particularly effective in removing the contamination as evidenced by the subsequent formation of sound welds on the clean workpieces.

It is believed that at least part of the cleaning effect of the jet of carbon dioxide results from the momentum with which it enters the weld gap. The momentum carries the carbon dioxide into the entire space to be occupied subsequently by the weld metal and enables particles of oil to be physically disengaged from the surfaces to be welded together and carried off with the carbon dioxide. Solid particles of carbon dioxide have of course a temperature well below ambient and it is further believed that the low temperature may contribute to the efficacy of the method according to the invention. Further, sublimation of the snow takes place in the weld gap with a large increase in volume, and this expansion may also contribute to the effectiveness of the method according to the invention.

The method according to the invention is further illustrated by the following example.

EXAMPLE

Experiments were performed on two pairs of aluminium test pieces each 300 mm long, 50 mm wide, and 3 mm thick and each deliberately contaminated with oil. A welded lap joint was made between both pairs of test pieces. One pair was subjected to the cleaning method according to the invention. A nozzle having a diameter of 1.6 mm at its exit was formed to use the jet of carbon dioxide. (If desired, a larger diameter nozzle may be used instead, for example one having a diameter of 3.2 mm.) The tip of the nozzle was held 5 mm away from the line of the weld. The carbon dioxide was supplied at a rate of 1 kg/min for up to 1 minute. (Other spray rates in the range of 0.5 to 2 kg/min could have been used instead.) A carbon dioxide supply pressure in the range of 20 to 50 bar was selected. The cleaned test pieces were allowed to stand for 5 minutes. During that time the surfaces were wiped with a clean cloth. This ensured removal of any residual particles and disengaged particles still in contact with the surfaces by the action of the carbon dioxide. The lap joint was then made as a 3 mm fillet weld by a GMAW welding method. The weld was inspected visually. No defects were found. The weld was then cut open, polished, and etched and viewed under a microscope. Again, no defects were found.

The procedure was repeated on the other pair of test pieces with the exception that they were not cleaned. The resulting weld was found to be porous.

Figure 2:
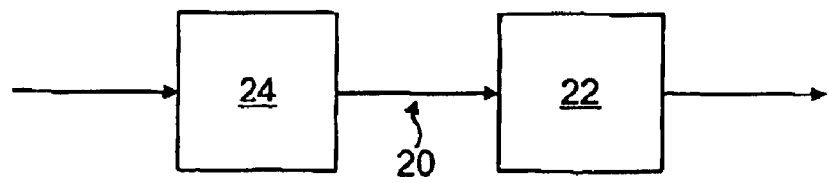
FIG. 2 is a schematic side elevation of a production line according to the present invention.

In FIG. 2 there is shown schematically part of an automotive production line. The production line 20 includes a fusion welding station 22 and upline thereof a station 24 for cleaning the surface to be welded, the cleaning being performed by the method according to the invention. The station 24 may include the equipment shown in FIG. 1. The production line may for example be for preparing car (automobile) bodies. The welding operation may be welding the roof to the main part of the car body or welding at any other part of the car.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

What is claimed is:

1. A method of cleaning metal surfaces to be welded together, comprising positioning the metal surfaces with a weld gap therebetween ready for welding, causing at least one jet carrying particles of solid carbon dioxide to come into contact with the metal surfaces and to enter the weld gap, and allowing the particles of solid carbon dioxide to sublime in the weld gap, wherein the jet carrying the particles of solid carbon dioxide is formed by passing a stream of liquid carbon dioxide under pressure through a nozzle.

2. The method according to claim 1, wherein the pressure is in the range of 20 to 50 bar.

3. The method according to claim 1, wherein an internal diameter of an outlet or the nozzle is less than a distance of the weld gap between the metal surfaces.

4. The method according to claim 2, wherein an internal diameter of an outlet of the nozzle is less than a distance of the weld gap between the metal surfaces.

5. The method according to claim 1, wherein the nozzle is located less than 100 mm away from the metal surfaces.

6. The method according to claim 2, wherein the nozzle is located less than 100 mm away from the metal surfaces.

7. The method according to claim 3, wherein the nozzle is located less then 100 mm away from the metal surfaces.

8. The method according to claim 4, wherein the nozzle is located less than 100 mm away from the metal surfaces.

9. The method according to claim 1, wherein the nozzle is located in the range of 5 mm to 50 mm away from the metal surfaces.

10. The method according to claim 1, wherein the metal surfaces are selected from the group consisting of aluminium, an aluminium-based alloy, a magnesium based alloy, and a titanium-based alloy.

11. The method according to claim 1, wherein the at least one jet moves at least once along an entire line of a weld to be made at the metal surfaces.

* * * * *